United States Patent
Hagemann

(10) Patent No.: US 6,603,843 B1
(45) Date of Patent: Aug. 5, 2003

(54) METHOD FOR THE TEMPORARY ALLOCATION OF TERMINALS AND USERS IN A PRIVATE VIRTUAL NETWORK

(75) Inventor: Joachim Hagemann, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/622,478

(22) PCT Filed: Nov. 30, 1998

(86) PCT No.: PCT/DE98/03520

§ 371 (c)(1),
(2), (4) Date: Aug. 17, 2000

(87) PCT Pub. No.: WO99/43138

PCT Pub. Date: Aug. 26, 1999

(30) Foreign Application Priority Data

Feb. 17, 1998 (DE) .................................... 198 06 588

(51) Int. Cl.⁷ .......................... H04M 15/00; H04M 3/42
(52) U.S. Cl. ............. 379/111; 379/114.03; 379/114.05; 379/114.21; 379/114.28; 379/201.01; 379/201.02; 370/259; 370/351
(58) Field of Search ........................... 379/111, 112.01, 379/114.01, 114.03, 114.05, 114.09, 114.21, 114.23, 114.26, 114.27, 114.28, 121.01, 127.05, 128, 201.01, 201.02, 201.03, 207.02, 207.03, 207.11, 207.13; 370/259, 271, 351, 352, 381, 384, 386

(56) References Cited

U.S. PATENT DOCUMENTS

| | | | | | |
|---|---|---|---|---|---|
| 4,961,217 A | * | 10/1990 | Akiyama | ..................... | 379/142 |
| 5,206,899 A | * | 4/1993 | Gupta et al. | ................. | 379/120 |
| 5,251,248 A | * | 10/1993 | Tokunaga et al. | ........... | 379/112 |
| 5,329,578 A | * | 7/1994 | Brennan et al. | ............. | 379/201 |
| 5,703,942 A | * | 12/1997 | Pinard et al. | ................ | 379/207 |
| 5,867,498 A | * | 2/1999 | Gillman et al. | .............. | 370/385 |
| 5,960,004 A | * | 9/1999 | Ramstrom et al. | .......... | 370/469 |
| 5,978,450 A | * | 11/1999 | McAllister et al. | ......... | 379/201 |

\* cited by examiner

*Primary Examiner*—Curtis Kuntz
*Assistant Examiner*—Quoc Tran
(74) *Attorney, Agent, or Firm*—Young & Thompson

(57) ABSTRACT

A virtual private network and method of allocating one of plural communication terminals to a user in the virtual private network includes offering plural different types of communication terminals for selection by the user, defining plural different user profiles for the user, selecting one of the different types of communication terminals for use by the user, and allocating a one of the plural different user profiles to the selected one of the plural different types of terminals as a function of the type of communication terminal.

7 Claims, 2 Drawing Sheets

METHOD FOR THE TEMPORARY ALLOCATION OF TERMINALS AND USERS IN A PRIVATE VIRTUAL NETWORK

The invention relates to a method and a device for temporarily allocating terminals and users in a virtual private network.

BACKGROUND OF THE INVENTION

The invention relates to a method as claimed in patent claim 1 and a device as claimed in patent claim 7.

The basic principle of virtual private networks is already known from 'Ambrosch, Maher, Sasscer (Eds.) "The Intelligent Network", Chapter 11: PVN Service Description'.

The resources of the already existing public communications network are used to provide a user with the possibility of setting up an enclosed network. This can be expressed in the form of a private branch exchange by making available services of this kind. This is particularly advantageous for subscribers who are located far apart from one another.

An important feature of this VPN is the private numbering plan. This means that each subscriber in this VPN has their own VPN-internal call number which is as a rule structured in a standardized way in the VPN (in that, for example, it is not necessary to know an area code) and is significantly shorter than the "physical" number of this terminal. For this to function, all the information on the composition of the VPN must be stored at a central point so that the correct destination subscriber can be determined when there is a call.

In this context, individual call numbers are always allocated to the same physical device. However, in many cases it is desirable if a device can be loaned without the tolls being charged to the registered owner of this device and without the user who is loaning the device erroneously receiving the owner's calls. In particular mobile phones whose popularity is ever-increasing, are often acquired for an entire department so that these devices are often transferred to the colleague who needs the device most urgently at a particular time. However, the subscriber can be accessed only by the small circle of people who know that he is carrying a mobile phone with him at that particular time and who also know the number of the device. This problem can, however, be avoided by means of a call divert if the device which is normally used by the subscriber has this performance feature.

A further problem occurs if the device has only a restricted functionality owing to the registered rights of a user in the VPN, for example the limiting of long distance calls.

SUMMARY OF THE INVENTION

The object of the invention is to simplify substantially the transfer of communications terminals to other users.

This object is achieved by means of a method in which a use profile can be defined for each subscriber in a VPN. The object is achieved by means of a device which enables user profiles to be defined and stored and which permits user profiles and terminals to be allocated.

As soon as a subscriber of a VPN (for example employees of a company) wishes to use a terminal from the common pool of devices, for example a specific device such as a multi-mode mobile phone, his personal user profile is allocated to this device in a database provided for this purpose, and said subscriber can use the device. As soon as said subscriber returns the device to the pool, he deactivates his user profile again by deleting the allocation of his profile and of the terminal again.

This procedure results in a number of advantages. A call divert to the respective device can be controlled centrally by means of the VPN, and there is no longer any dependence on the presence of the "call divert" performance feature. The accessibility of the subscriber can thus be improved substantially. The calling party selects the number which is already known to him, and it is determined in the database of user profiles whether at that particular time a subscriber has activated a user profile on a particular device, is carrying said device with him, and transfers the call there.

Because the existing devices are as a rule not continuously in use, they can be returned to a common pool so that any person who requires such a device at short notice can also be provided with one easily.

Limitations on the range of functions, for example the restriction to domestic calls, are not defined with respect to a device but can instead be tailored to the respective user.

It is also, for example, conceivable for the pool of common devices to contain different types of devices which are selected depending on the requirements. It may therefore be appropriate to define for one subscriber a plurality of user profiles which can then be selected and activated as a function of the type of device.

If a device is lost, the damage can be minimized if it can be disabled to prevent further use at least in the VPN by deactivating the user profile.

The range of functions of the terminal can be defined by the entries into a user profile. The range of the terminal can be defined by creating an "authorized" or "prohibited" list. In the former case, the user may dial only the expressly enabled numbers or ranges of numbers (for example area code, country code, only within the VPN), and in the latter case he cannot dial precisely those numbers or ranges of numbers.

A further feature of the user profile may be the operating time of the device. Hours or days are enabled or disabled, and the terminal is thus, for example, disabled for use for private purposes at the weekend.

The user profile can be activated for a terminal in different ways. One possible way is to allocate the user profile to a terminal in a database by means of a central administrator (which is as a rule not present in a VPN). This has the advantage that misuse is avoided, but on the other hand it is extremely costly in terms of personnel, in particular if the loan times are only very short (that is to say on a daily or hourly basis). The alternative to this would be for each subscriber to be able to activate his user profile himself, for example by calling a special service number and entering a PIN from the selected terminal, or by making a call from any terminal to the central administration system in order to carry out a menu-prompted amendment of the entries in the administering database. This is a more flexible possibility, but requires the user to be reliable and to have a relatively wide range of knowledge.

A substantial advantage of the procedure according to the invention is the resulting correct billing. This means that only the person who has actually used the terminal pays. At the same time, the subscriber who is to be billed may not be the user of the device, for example if the pool of devices is in a company and the billing is to be reassigned to the different areas of the organization.

In addition, it is conceivable for individual subscribers or groups of subscribers to have agreed a special billing system with the service provider, for example a type of "frequent use discount".

BRIEF DESCRIPTION OF THE DRAWINGS

The invention will be explained in more detail below with reference to exemplary embodiments. Here.

DESCRIPTION OF THE PREFERRED EMBODIMENTS

Figure 1:
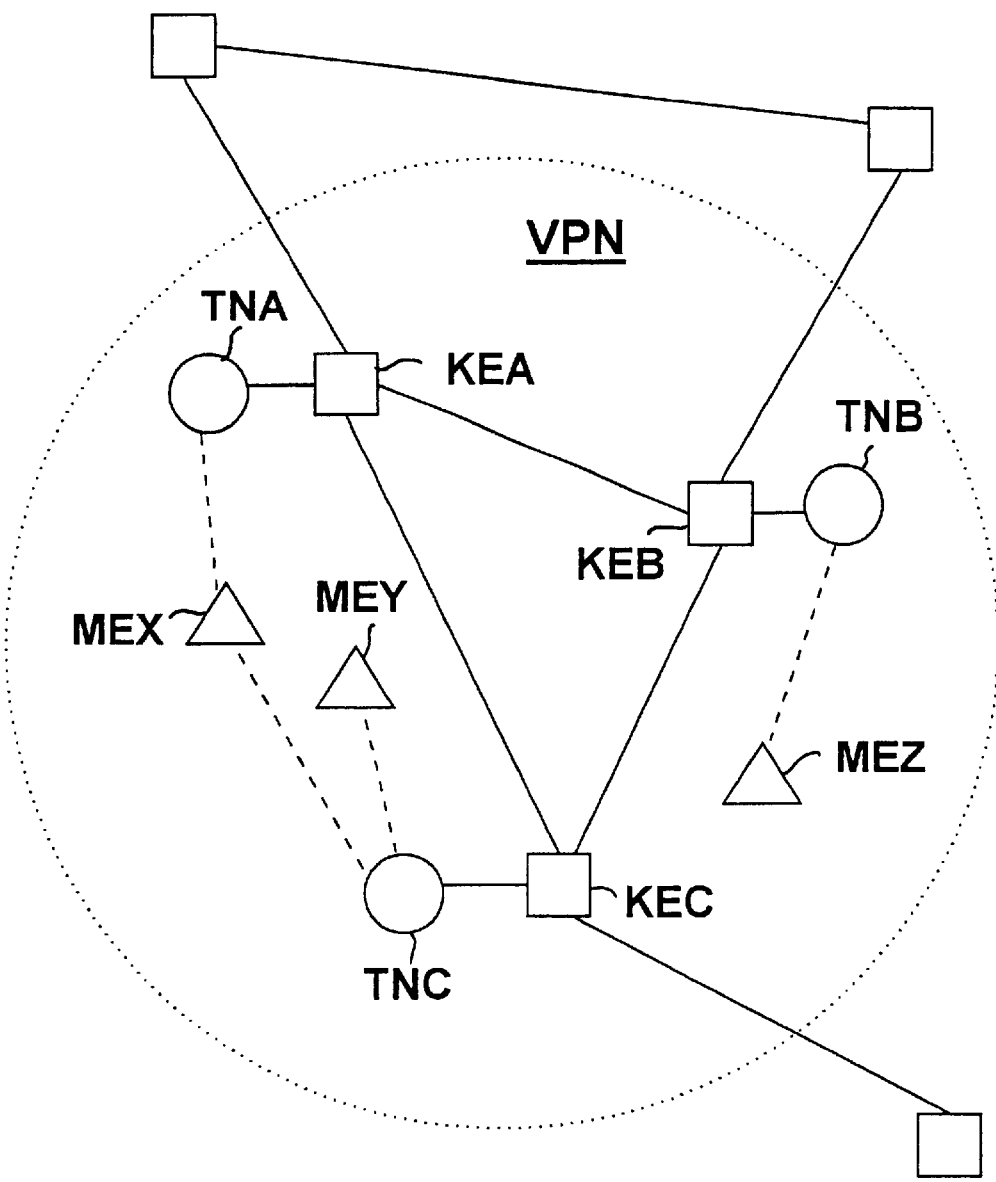
FIG. 1, shows a telecommunications network with a subnetwork VPN, subscribers TN in this subnetwork, conventional communications terminals KE and special devices ME in a pool of devices

FIG. 1 shows by way of example the structure of a telecommunications network with a subnetwork VPN containing three subscribers TNA, TNB, TNC. These subscribers each have a fixed assess to the telecommunications network via conventional telecommunications terminals KEA, KEB, KEC. In addition, there are also three special devices MEX, MEY and MEZ in this VPN. Said special devices are temporarily allocated to the different subscribers as users. Here, a subscriber can use different devices (for example with different use profiles) or a device can be used by different subscribers.

Figure 2:
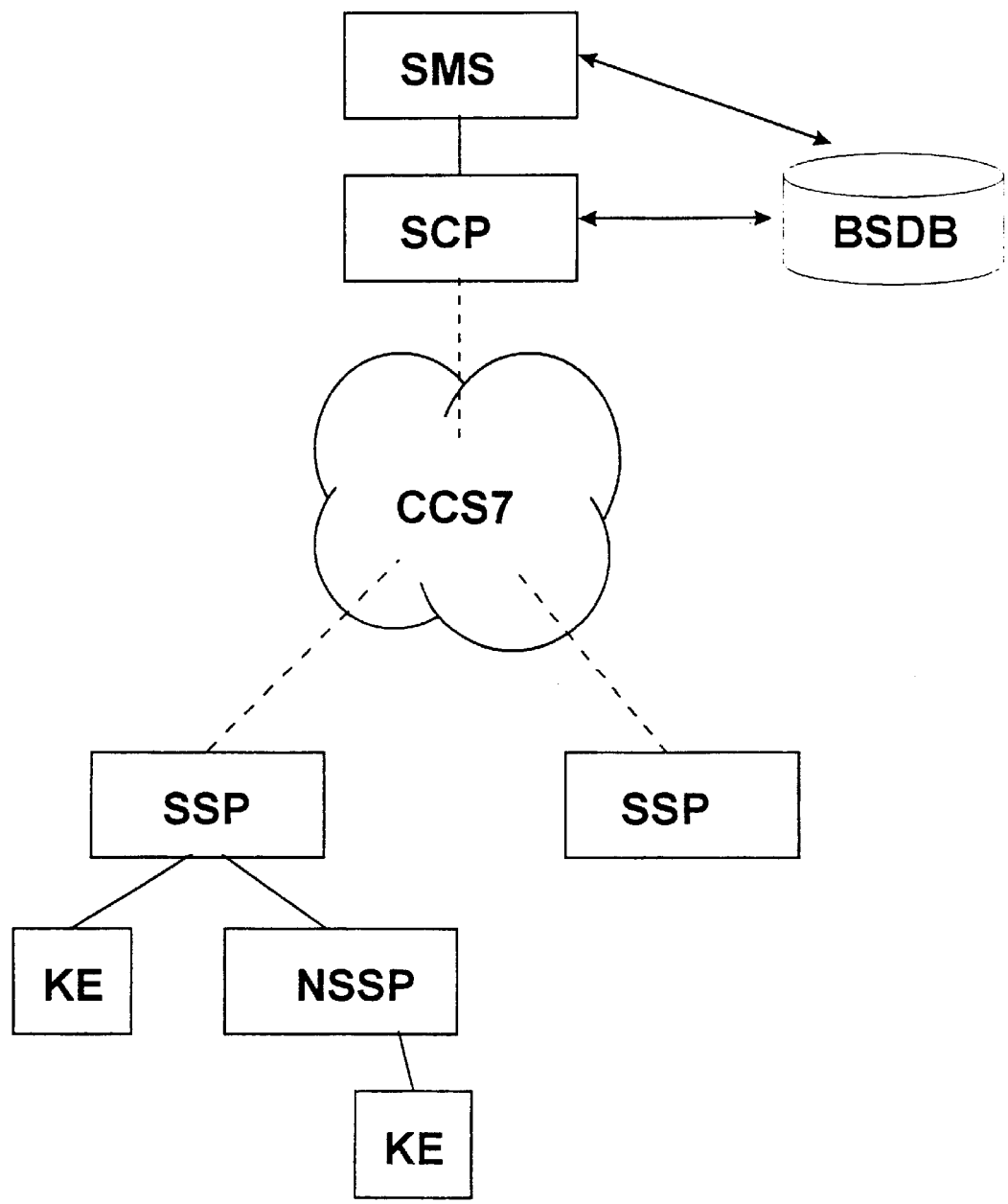
FIG. 2, shows an arrangement by means of which user profiles can be stored and allocated to specific terminals.

FIG. 2 shows a way of implementing the device for storing and allocating user profiles in an intelligent network IN. This is an architecture for providing services in a communications network, in particular, a virtual private network can also be implemented by means of IN.

The subscribers KE in this network are connected to the communications network via service switching points SSP or even extensions NSSP. A central entity SCP is responsible for the correct recognition and forwarding of connection wishes within the network, in particular the implementation of the private numbering plan of the VPN. This information is stored in a database BSDB which can be interrogated by the SCP at any time and amended by a central administration system SMS. This structure can then be used to define and store the user profiles in the database BSDB or in an additional database. The profiles can be amended by the administration system, the profiles are also allocated to the terminals KE by means of the administration system or by means of the subscriber via the SCP.

During the connection setup, the service switching point is interrogated at the SCP. It is clarified whether the terminal used by the calling subscriber is allocated to a valid user profile. In addition it is tested whether the number dialed by the subscriber is not excluded by the user profile. Before the connection can be switched through successfully, it is necessary also to ensure whether the connection request can be forwarded to the device which has actually been physically dialed, and whether the destination call number is a number from the private numbering plan of the VPN, or whether the destination subscriber is using one of the terminals from the common pool of devices at that particular time.

List of References

W. D. Ambrosch, A. Maher, B. Sasscer (Eds.) The Intelligent Network,A

Joint Study by Bell Atlantic, IBM and Siemens, Springer Verlag [publishing house] Berlin Heidelberg 1989

List of Abbreviations

BSDB Business Service Database
CCS7 Common Channel Signaling System No. 7
IN Intelligent Network
KE Communications terminal
ME Mobile terminal
PVN Private Virtual Network (see also VPN)
SCP Service Control Point
SMP Service Management Point
SSP Service Switching Point
TN Subscriber
VPN Virtual Private Network (see also PVN)

What is claimed is:

1. A method of allocating one of plural communication terminals to a first user in a virtual private network that is an enclosed subnetwork of a public communications network, the virtual private network providing special services that are available only to users of the virtual private network, the method comprising the steps of:

offering plural different types of the communication terminals for selection by the first user;

defining plural different user profiles for the first user, each of the plural different user profiles including billing information;

selecting one of the plural different types of communication terminals for use in the virtual private network by the first user; and allocating a one of the plural different user profiles to the selected one of the plural different types of terminals as a function of the type of communication terminal.

2. The method as claimed in claim 1, wherein each of the user profiles contains information on permitted destination call numbers or ranges of call numbers to which the user is allowed to set up a connection.

3. The method as claimed in claim 1, wherein each of the user profiles contains information on prohibited destination call numbers or ranges of call numbers to which the user is not allowed to set up a connection.

4. The method as claimed in claim 1, wherein each of the user profiles contains time information by means of which the availability of the selected terminal is controlled.

5. The method as claimed in claim 1, wherein each of the user profiles is activated by a Person Identification Number PIN entered at the selected terminal.

6. The method as claimed in claim 1, wherein each of the user profiles is allocatable to the selected terminal by a central administration system of the subnetwork.

7. A virtual private network that is an enclosed subnetwork of a public communications network, the virtual private network providing special services that are available only to users of the virtual private network, the virtual private network comprising:

plural different types of communication terminals that are offered for selection by a first user of the virtual private network;

plural different user profiles defined for said first user, each of said plural different user profiles including billing information;

each of said plural different types of communication terminals being selectable for use in the virtual private network by said first user; and a one of said plural different user profiles being allocatable to a selected one of said plural different types of communication terminals as a function of a type of said selected one of said plural different types of communication terminals.

* * * * *